United States Patent
Umemoto et al.

(10) Patent No.: US 11,598,737 B2
(45) Date of Patent: Mar. 7, 2023

(54) ANALYZING APPARATUS AND ANALYZING METHOD

(71) Applicant: Hitachi High-Tech Science Corporation, Tokyo (JP)

(72) Inventors: Takeshi Umemoto, Tokyo (JP); Shinya Nishimura, Tokyo (JP); Susumu Ito, Tokyo (JP); Nobuaki Okubo, Tokyo (JP)

(73) Assignee: Hitachi High-Tech Science Corporation, Tokyo (JP)

(*) Notice: Subject to any disclaimer, the term of this patent is extended or adjusted under 35 U.S.C. 154(b) by 1207 days.

(21) Appl. No.: 16/105,194

(22) Filed: Aug. 20, 2018

(65) Prior Publication Data
US 2019/0064091 A1 Feb. 28, 2019

(30) Foreign Application Priority Data
Aug. 22, 2017 (JP) .............................. JP2017-159548

(51) Int. Cl.
*G01N 25/48* (2006.01)

(52) U.S. Cl.
CPC ................. *G01N 25/4826* (2013.01)

(58) Field of Classification Search
CPC .................................................. G01N 25/4826
USPC ......................................................... 702/136
See application file for complete search history.

(56) References Cited

U.S. PATENT DOCUMENTS

| 9,244,086 B2* | 1/2016 | Yao ................. G01N 35/00712 |
| 2007/0143240 A1* | 6/2007 | Goldwasser ........... G16H 10/40 706/47 |
| 2018/0190386 A1* | 7/2018 | Yoshikawa ............ G06Q 10/00 |

FOREIGN PATENT DOCUMENTS

| JP | H08-068739 A | 3/1996 |
| JP | 2008-232654 A | 10/2008 |
| JP | 2009-019913 A | 1/2009 |

* cited by examiner

*Primary Examiner* — Ricky Go
(74) *Attorney, Agent, or Firm* — Banner & Witcoff, Ltd.

(57) ABSTRACT

An analyzing apparatus includes a memory unit that stores analysis conditions of each standards specifying analysis conditions for each analytical technique, a control unit, and an analysis unit that performs an analysis in accordance with a predetermined analytical technique. The control unit reads out the analysis conditions of the standard, and the control unit displays analysis conditions in time sequence, the displayed analysis conditions being necessary for the analysis and selected from out of the read-out analysis conditions, or the control unit prompts to input the analysis conditions in time sequence. When the analysis conditions are input, the control unit determines whether or not the input analysis conditions comply with the read-out analysis conditions, and in a case where a result of the determination is positive, the control unit displays a next analysis condition being necessary for the analysis, or the control unit prompts to input the next analysis condition.

8 Claims, 17 Drawing Sheets

FIG. 1

| ANALYTICAL TECHNIQUES | | STANDARDS | | |
|---|---|---|---|---|
| | | ISO | ASTM | JIS |
| DSC | SPECIFIC HEAT CAPACITY MEASUREMENT | ISO 11357-4 | ASTM E1269 | JIS K 7123 |
| TG | REACTION SPEED ANALYSIS (OZAWA METHOD) | ISO 11358-3 | ASTM E1641-16 | |
| TG | ISOLATIVE DETERMINATION | ISO 9924-1 (RUBBER) ISO 9924-2 (RUBBER) ISO 9924-3 (RUBBER) | ASTM E1131-08 (2014) | JIS K6226-1 (RUBBER) JIS K6226-2 (RUBBER) |

FIG. 2

| OPERATING STEPS | SETTING ITEMS | STANDARDS | |
| --- | --- | --- | --- |
| | | JIS K 7123 | ISO 11357 |
| 1  CONTAINER | MASSES OF 4 CONTAINERS USED FOR MEASUREMENT (INCLUDING COVERS) | WITHIN MASS DIFFERENCE OF 2% | WITHIN MASS DIFFERENCE OF 0.1 mg |
| 2  SETTING MEASUREMENT CONDITIONS | | DIFFERENCE BETWEEN MEASUREMENT STARTING TEMPERATURE AND MEASUREMENT ENDING TEMPERATURE IS 50 TO 100°C. | |
| | STARTING TEMPERATURE | WHEN THERE IS TRANSITION IN RANGE OF MEASURED TEMPERATURES, TEMPERATURE AT LEAST 20°C LOWER THAN TRANSITION STARTING TEMPERATURE | A TEMPERATURE AT LEAST 30°C LOWER THAN DATA OBTAINING TEMPERATURE |
| | LIMIT TEMPERATURE | WHEN THERE IS TRANSITION IN RANGE OF MEASURED TEMPERATURES, TEMPERATURE AT LEAST 20°C HIGHER THAN TRANSITION ENDING TEMPERATURE | |
| | RATE | 10°C/min, PRECISION ±0.5°C/min | 5 TO 10°C/min |

|   |   | HOLD TIME AT INITIAL TEMPERATURE |   | TYPICALLY, 2 TO 10 MINUTES |
|---|---|---|---|---|
|   |   | HOLD TIME AFTER TEMPERATURE RISE |   | TYPICALLY, 2 TO 10 MINUTES |
|   |   | TYPE OF GAS | NITROGEN |   |
|   |   | FLUX OF GAS | 10 TO 50 ml/min |   |
| 3 | MEASURING EMPTY CONTAINER |   |   |   |
| 4 | MEASURING REFERENCE MATERIAL | REFERENCE SAMPLE<br><br>WEIGHT OF REFERENCE SAMPLE | α-ALUMINA HAVING PURITY OF 99.9% OR HIGHER (SYNTHETIC SAPPHIRE ETC)<br>10 TO 30 mg, MEASURE TO 0.01 mg | α-ALUMINA HAVING PURITY OF 99.9% OR HIGHER (SYNTHETIC SAPPHIRE ETC) |
| 5 | MEASURING SAMPLE TO BE MEASURED | WEIGHT OF SAMPLE | 5 TO 10 mg, MEASURE TO 0.01 mg | 2 TO 40 mg |

FIG. 9

TABLE OF CONTENT SCREEN
INPUT EMPTY CONTAINER SCREEN
INPUT MEASUREMENT CONDITIONS SCREEN
MEASUREMENT SCREEN
INPUT REFERENCE MATERIAL SCREEN
MEASUREMENT SCREEN
INPUT SAMPLE SCREEN
MEASUREMENT SCREEN

SELECTION GUIDANCE:
SPECIFIC HEAT CAPACITY MEASUREMENT ISO11357-4

RETURN
EXIT
NEXT

INPUT INFORMATION ABOUT EMPTY CONTAINER

NAME OF SAMPLE
MASS OF SAMPLE
PAN
NAME OF REFERENCE
MASS OF REFERENCE
NAME OF DATA FILE
OPERATOR

☐ PERMIT OVERWRITE
☐ AUTOMATICALLY UPDATE FILE NAME

FIG. 12

TABLE OF CONTENT SCREEN
INPUT EMPTY CONTAINER SCREEN
INPUT MEASUREMENT CONDITIONS SCREEN
MEASUREMENT SCREEN
INPUT REFERENCE MATERIAL SCREEN
MEASUREMENT SCREEN
INPUT SAMPLE SCREEN
MEASUREMENT SCREEN

SELECTION GUIDANCE:
SPECIFIC HEAT CAPACITY MEASUREMENT ISO11357-4

RETURN
EXIT
NEXT

INPUT INFORMATION ABOUT REFERENCE MATERIAL

PERMIT INPUT
☑ NAME OF SAMPLE — α-ALUMINA HAVING PURITY OF 99.9% OR HIGHER (SYNTHETIC SAPPHIRE etc.)
☑ MASS OF SAMPLE
☑ PAN
☑ NAME OF REFERENCE
☑ MASS OF REFERENCE
☑ NAME OF DATA FILE
OPERATOR

☐ PERMIT OVERWRITE
☐ AUTOMATICALLY UPDATE FILE NAME

FIG. 14

TABLE OF CONTENT SCREEN
INPUT EMPTY CONTAINER SCREEN
INPUT MEASUREMENT CONDITIONS SCREEN
MEASUREMENT SCREEN
INPUT REFERENCE MATERIAL SCREEN
MEASUREMENT SCREEN
INPUT SAMPLE SCREEN
MEASUREMENT SCREEN

SELECTION GUIDANCE:
SPECIFIC HEAT CAPACITY MEASUREMENT ISO11357-4

RETURN     EXIT
           NEXT

INPUT INFORMATION ABOUT SAMPLE

PERMIT INPUT
☑ NAME OF SAMPLE
☑ MASS OF SAMPLE   VALUE EXCEEDS SPECIFIED RANGE.
   50                2~40mg
☑ PAN
☑ NAME OF REFERENCE
☑ MASS OF REFERENCE
☑ NAME OF DATA FILE
   OPERATOR

☐ PERMIT OVERWRITE
☐ AUTOMATICALLY UPDATE FILE NAME

ANALYZING APPARATUS AND ANALYZING METHOD

CROSS-REFERENCE TO RELATED APPLICATION

This application claims priority from Japanese Patent Application No. 2017-159548, filed on Aug. 22, 2017, the entire subject matters of which is incorporated herein by reference.

BACKGROUND

1. Field of the Invention

The present disclosure relates to an analyzing apparatus exemplified in a thermal analyzing apparatus or the like, and an analyzing method.

2. Background Art

Standards, such as ISO (International Organization for Standardization), JIS (Japanese Industrial Standards), ASTM (American Society for Testing and Materials), and the like, are defined for an analysis like a thermal analysis, many of which provide predetermined measurement conditions and the like in detail. For example, standards for the thermal analysis include Differential Scanning calorimetry (DSC), Differential Thermal Measurement (DTA), Thermogravimetric (TG), Thermomechanical Analysis (TMA), and the like. However, as illustrated in FIG. 1, ISO 11357-4, JIS K7123, and ASTM E1269 have defined standards each for specific heat capacity measurement by the DSC.

Purposes and procedures of measurement in accordance with the standards are roughly the same. However, as illustrated in FIG. 2, there are differences in detailed analysis conditions (heating patterns, sample masses, etc.). Also, in case of submitting an analysis result within a country or to a foreign country, different analysis methods may be required in some cases based on standards complying with official laws and regulations corresponding to each regions or fields.

Meanwhile, in an analysis institution or the like that carries out various analyses in large quantities routinely, the workload on an operator may be reduced by performing a series of analysis procedures using a flow file. Therefore, a technique for facilitating creation of a flow has been developed (See JP-A-2008-232654.).

However, in the case of the technique disclosed in JP-A-2008-232654, a flow can be created with analysis conditions which are usually handled by an operator and the operator is familiar with. However, it is difficult to create each flow for analyses to be performed in accordance with various complicated standards.

In other words, as illustrated in FIGS. 1 and 2, in the case of a specific heat capacity measurement by DSC, it is necessary to create flows by inputting different measurement conditions for every one of a plurality of standards including ISO 11357-4, JIS K7123, and ASTM E1269. Therefore, the workload on the operator is large and human errors of inputting incorrect numerical values or the like may easily occur. Furthermore, for example, sample weights for a plurality of standards may be slightly different from one another, and the analysis may be performed based on an erroneous sample weight by misunderstanding.

Furthermore, when analyzed data is interpreted to obtain a target result, it is also necessary to perform an interpretation procedure in accordance with the definition of a standard. However, it is also necessary to read out the standard corresponding to the interpretation procedure and configure an analyzing apparatus, and thus the workload on the operator increases further.

SUMMARY

An object of the present disclosure is to provide an analyzing apparatus and an analyzing method that enable to reduce a workload on an operator and prevent erroneous analysis when the operator performs an analysis by a predetermined analytical technique in accordance with a standard.

According to an exemplary embodiment of the present disclosure, there is provided an analyzing apparatus including:

a memory unit configured to store analysis conditions of one or more standards specifying analysis conditions for each of one or more analytical techniques, a control unit;

a display unit;

an input unit; and an analysis unit configured to perform an analysis in accordance with the analytical technique, wherein when the analytical technique is designated, the control unit reads out the analysis conditions of the corresponding standard, and the control unit displays analysis conditions in time sequence, the displayed analysis conditions being necessary for the analysis by the analysis unit and selected from out of the read-out analysis conditions, or the control unit prompts to input the analysis conditions in time sequence, and when the analysis conditions are input through the input unit, the control unit determines whether or not the input analysis conditions comply with the read-out analysis conditions, and in a case where a result of the determination is positive, the control unit displays a next analysis condition being necessary for the analysis by the analysis unit, or the control unit prompts to input the next analysis condition.

According to another exemplary embodiment of the present disclosure, there is provided an analyzing method of storing analysis conditions of one or more standards specifying analysis conditions for each of one or more analytical techniques to perform an analysis corresponding to the analytical technique, the method including:

a first step of, when the analytical technique is designated, reading out the analysis conditions of the corresponding standard, and displaying analysis conditions in time sequence, the displayed analysis conditions being necessary for the analysis and selected from out of the read-out analysis conditions, or prompting to input the analysis conditions in time sequence, and a second step of, when the analysis conditions are input through an input unit, determining whether or not the input analysis conditions comply with the read-out analysis conditions, and in a case where a result of the determination is positive, displaying a next analysis condition being necessary for the analysis by the analysis unit, or prompting to input the next analysis condition.

According to the present disclosure, it is possible to reduce a workload on an operator and prevent erroneous analysis when the operator performs an analysis by a predetermined analytical technique in accordance with a standard.

BRIEF DESCRIPTION OF THE DRAWINGS

In the accompanying drawings:

FIG. 1 is a diagram illustrating a standard for each analytical technique for a thermal analysis;

FIG. 2 is a diagram illustrating analysis conditions of a standard for a specific heat capacity measurement by DSC;

FIG. 9 is a diagram continuing from FIG. 8;

FIG. 12 is a diagram continuing from FIG. 11;

FIG. 14 is a diagram continuing from FIG. 13;

DETAILED DESCRIPTION

Figure 3:
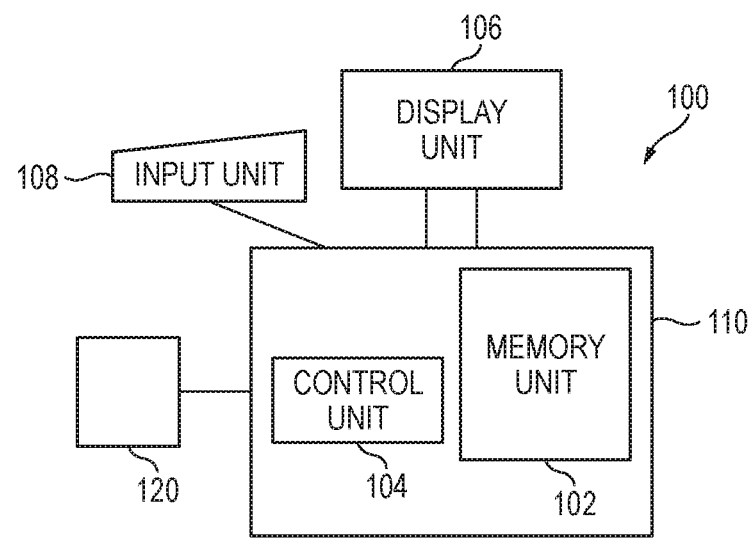
FIG. 3 is a block diagram illustrating a configuration of an analyzing apparatus according to an embodiment of the present disclosure.
Figure 4:
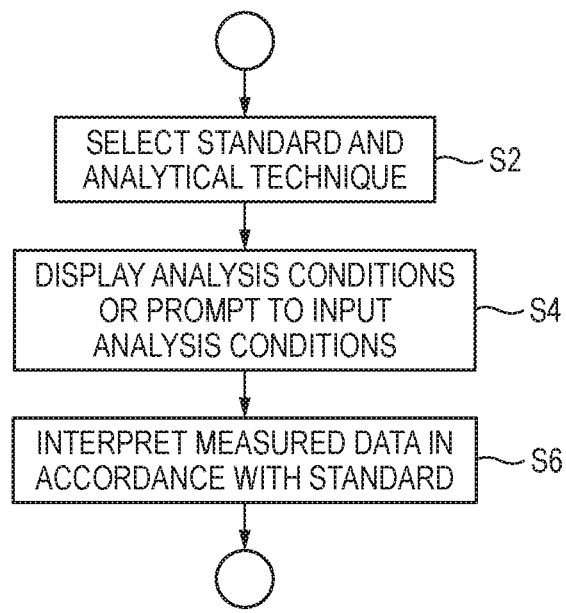
FIG. 4 is a diagram illustrating a flow of a process performed in an analyzing apparatus.
Figure 5:
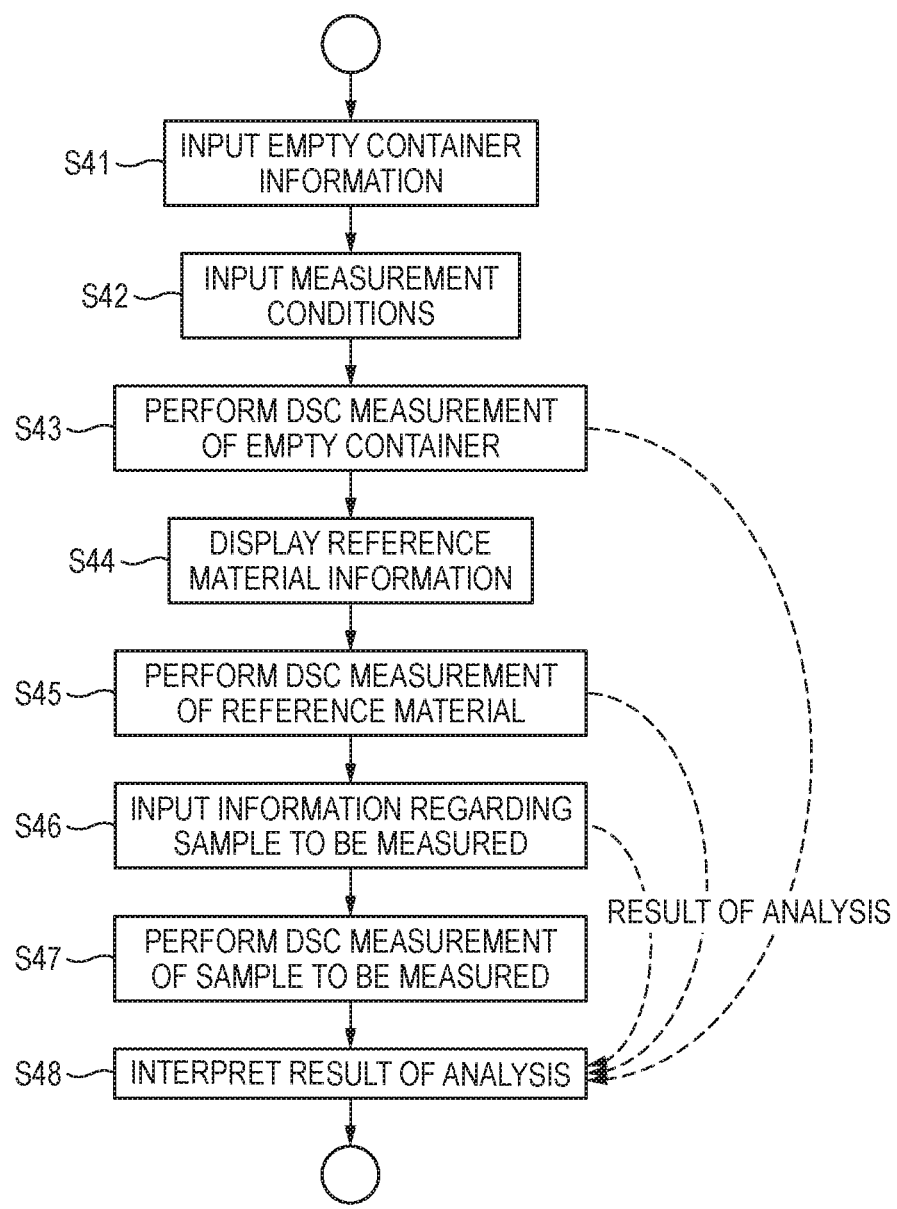
FIG. 5 is a diagram continuing from FIG. 4.

Hereinafter, embodiments of the present disclosure will be described with reference to the drawings. FIG. 3 is a block diagram illustrating configuration of an analyzing apparatus 100 according to an embodiment of the present disclosure. FIGS. 4 and 5 are diagrams illustrating a process flow performed in the analyzing apparatus 100, and FIGS. 6 to 17 are examples of switching a screen displayed on a display unit.

Furthermore, according to the present embodiment, the analyzing apparatus 100 is a Differential Scanning Calorimetry (DSC) apparatus.

As illustrated in FIG. 3, the analyzing apparatus 100 includes an analysis unit 120 that performs a DSC measurement and a computer 110. The computer 110 is composed of, for example, a personal computer and includes a memory unit 120 like a hard disk, a control unit 104 like a CPU, a display unit 106 like a liquid crystal display monitor, and an input unit 108 like a keyboard or a touch panel. Furthermore, the computer 110 is connected to the analysis unit 120, and the control unit 104 controls analysis operations performed by the analysis unit 120.

The memory unit 102 stores analysis conditions of one or more standards. Here, the standards refer to official requirements and specifications of analysis conditions in a predetermined analytical technique. Examples of the standards may include ISO 11357-4, JIS K 7123, and ASTM E 1269 as illustrated in FIG. 1.

As illustrated in FIG. 2, for example, the analysis conditions include a heating pattern (temperature control information) of a sample to be analyzed, sample atmosphere information (type and flux of gas to be introduced into a sample chamber), mass of the sample, composition of a reference sample, and mass of a sample container and the like. However, the analysis conditions are not limited thereto as long as the condition is specified in a standard.

Also, the "analytical technique" is a test method used for the actual analysis, which corresponds to the "specific heat capacity measurement by the DSC" in the present embodiment. Analytical techniques are also specified in standards.

Furthermore, as illustrated in FIG. 4, for example, when an operator designates an analytical technique via the input unit 108 (step S2), the control unit 104 reads out corresponding analysis conditions of a standard from the memory unit 102 and displays them in time sequence or prompts the operator to input analysis conditions in time sequence (step S4). Also, when the analysis conditions are determined, the control unit 104 controls the operation of the analysis unit 120 so as to analyze in accordance with the analytical technique.

Furthermore, after the analysis by the analysis unit 120 is completed, the control unit 104 automatically interprets in accordance with the standard corresponding to the analytical technique (step S6).

Furthermore, in FIG. 4, in addition to the analytical technique, a standard with which the analytical technique complies is designated (selected) in step S2. This is because, as illustrated in FIG. 1, for example, the "specific heat capacity measurement by the DSC" complies with multiple (three) standards and, when the analytical technique complies with only one standard, only the analytical technique may be designated.

Next, with reference to FIG. 5, the process of step S4 will be described in detail.

Furthermore, according to the present embodiment, the "specific heat capacity measurement by the DSC" is performed in accordance with the standard "ISO 11357-4", and these are designated in step S2.

Figure 8:
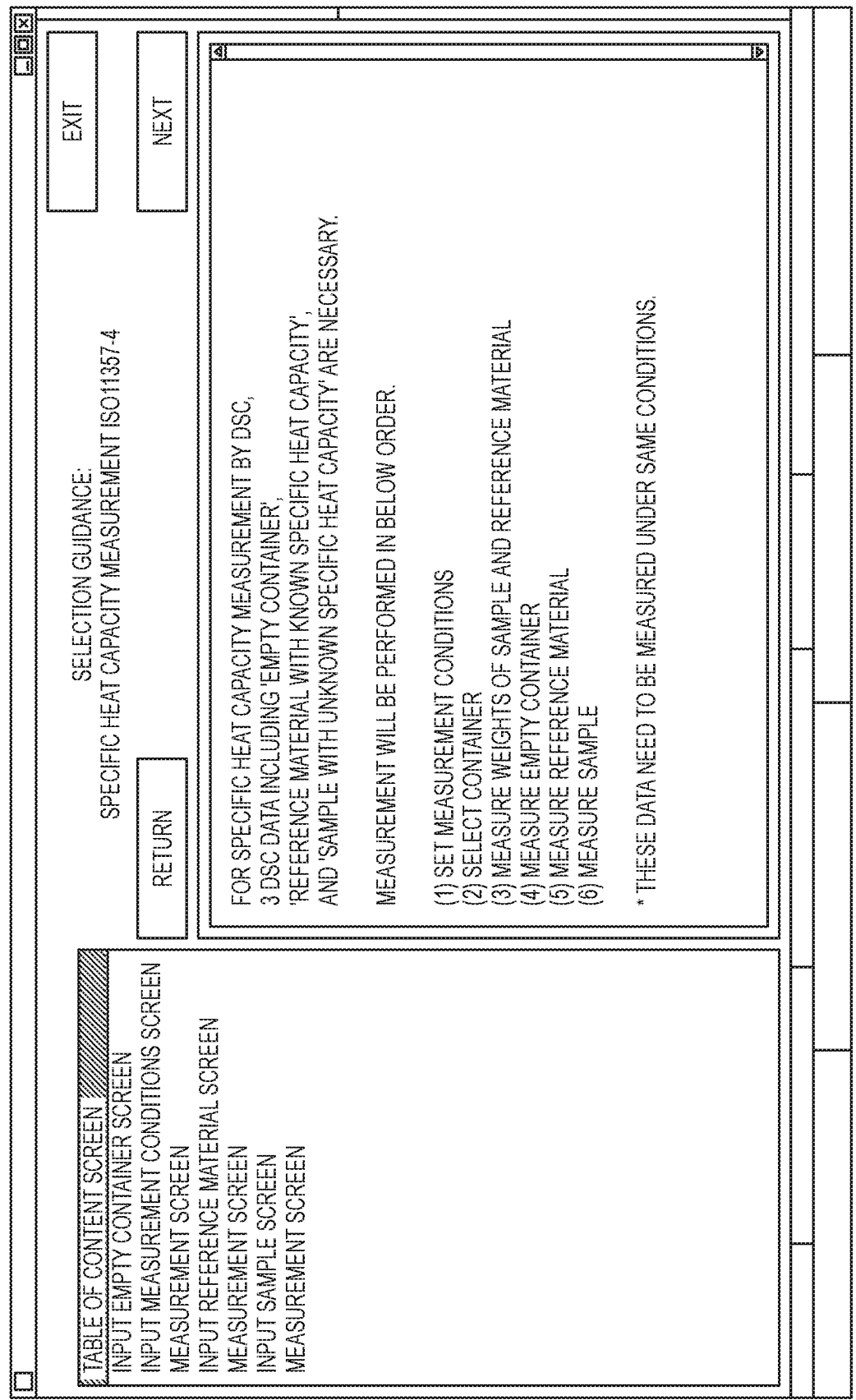
FIG. 8 is a diagram continuing from FIG. 7.

First, the control unit 104 prompts to input information regarding an empty container (step S41). Here, although not illustrated in FIG. 1 and FIG. 2, a material (heat resistance) of the empty container is designated according to a target temperature of a heating pattern described below. Therefore, in the information regarding the empty container, a material constituting the empty container is designated ("pan" in FIG. 9) for a container selection (FIG. 8). For example, when the target temperature is set to be from a room temperature to 600 degrees centigrade, an aluminum pan is designated. Otherwise, a platinum pan is designated.

Furthermore, according to the present embodiment, total four containers, that is, a reference-side container, an empty container, a container for accommodating a reference material, and a container for accommodating a sample to be measured are used. Same containers are used as reference-side containers for the latter three measurements.

Furthermore, in the DSC measurement, while an empty container is installed on the reference side, (1) a container containing nothing (empty container), (2) a container accommodating a reference material, and (3) a container accommodating a sample to be measured are installed on the sample side and measurements (total of 3 measurements) are performed.

Next, the control unit 104 prompts to input a "measurement condition", which is the analysis condition for the next analysis (step S42). The measurement condition is a heating pattern (temperature control information) and, as illustrated in the screen of the display unit 106 described below (FIG. 10), the operator may input the measurement condition by opening a method file having recorded therein a heating pattern (a starting temperature, a heating rate, a hold time, etc.) in advance and changing numerical values therein as necessary.

Figure 10:
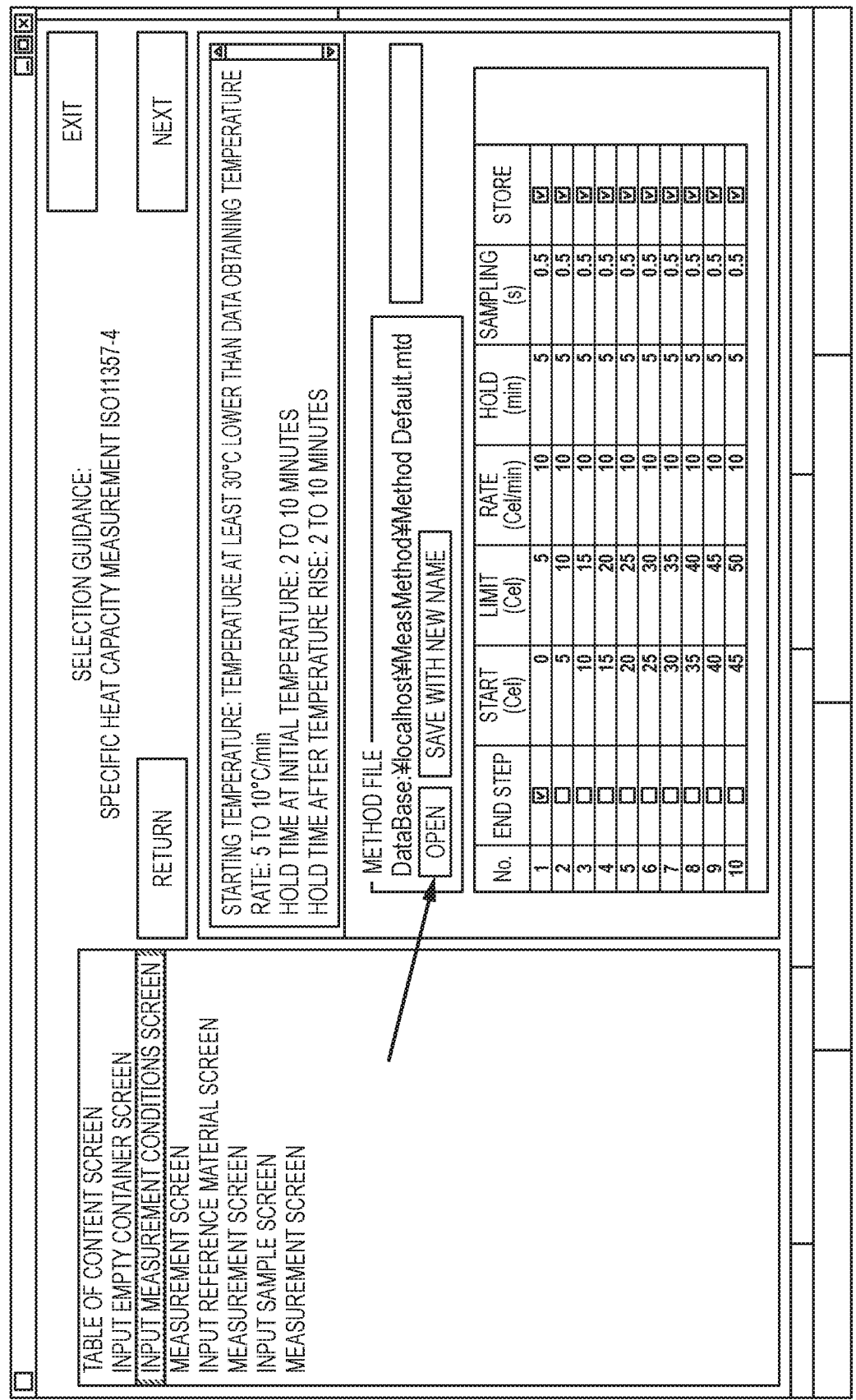
FIG. 10 is a diagram continuing from FIG. 9.

When the operator clicks "next" on the screen illustrated in FIG. 10, the control unit 104 determines whether each numerical value of the heating pattern or the like complies with the analysis conditions read out from the memory unit 102 (see FIG. 2). Next, when a result of the determination is positive, the control unit 104 performs the DSC measurement of the empty container below (step S43). The step S43 will be described below.

On the other hand, when a result of the determination is negative (No), the control unit 104 does not proceed to the step S43, and the screen of the display unit 106 remains as illustrated in FIG. 10. Therefore, the operator needs to adjust numerical values of the heating pattern, such that the screen proceeds.

Figure 11:
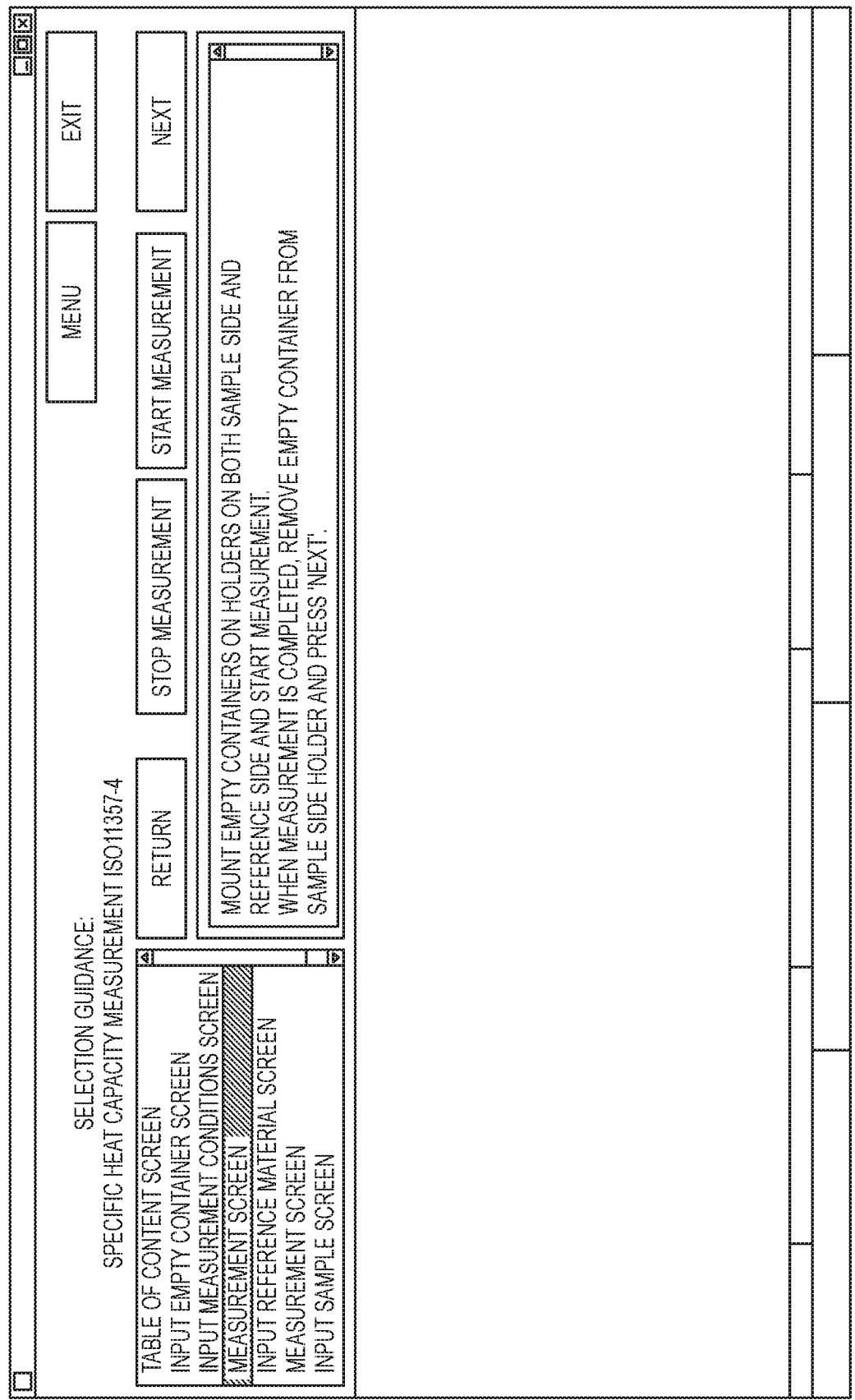
FIG. 11 is a diagram continuing from FIG. 10.

Next, the control unit 104 performs the DSC measurement of the empty container in the step S43. In the step S43, as illustrated in FIG. 11, the control unit 104 displays an actual measurement procedure in a display box to guide the operator. When the operator clicks "start measurement", the control unit 104 controls the operation of the analysis unit 120 to perform the DSC measurement of the empty container.

When the step S43 is completed, the control unit 104 displays "reference material information", which is the analysis condition for the next analysis (step S44). As illustrated in FIG. 12, the operator inputs "sample name" and "sample weight".

In the step S44, only "α-alumina having a purity of 99.9% or higher (synthetic sapphire or the like)", which is the analysis condition of the "reference material", is displayed on the screen of the display unit 106 (FIG. 12), and it is not determined whether the composition of the "reference material" is an actually suitable analysis condition.

In this regard, even when only the analysis conditions are displayed, the analysis conditions may guide the operator to determine whether the analysis is being performed in accordance with the standard.

Next, the control unit 104 performs DSC measurement of the reference material (step S45). In the step S45, the control unit 104 displays the actual measurement procedure in the display box in the screen of the display unit 106 (FIG. 13) described below to guide the operator. When the operator clicks "start measurement", the control unit 104 controls the operation of the analysis unit 120 to perform the DSC measurement of the reference material.

Next, the control unit 104 prompts to input "information regarding sample to be measured", which is the analysis condition for the next analysis (step S46). The information regarding sample to be measured is the mass of sample to be measured (the sample weight in FIG. 2), which is the analysis condition, and the control unit 104 displays an input box prompting to input the sample weight on the screen of the display unit 106 (FIG. 14) described below. Here, the operator measures the weight of the sample offline by using a scale and inputs measured value.

Next, the control unit 104 determines whether the input sample weight complies with the analysis condition (see FIG. 2; sample weight from 2 mg to about 40 mg) read out from the memory unit 102. Then, in a case where the result of the determination is positive, the control unit 104 performs the DSC measurement of the sample to be measured (step S47). In the step S47, the control unit 104 displays an actual measurement procedure in the display box in the screen of the display unit 106 (FIG. 15) described below to guide the operator. When the operator clicks "start measurement", the control unit 104 controls the operation of the analysis unit 120 to perform the DSC measurement of the sample to be measured.

On the other hand, when the result of the determination is negative (No), the control unit 104 does not proceed to the step S43, and the screen of the display unit 106 remains as illustrated in FIG. 14. Therefore, the operator needs to adjust the weight of the sample, such that the screen proceeds.

In this regard, when the DSC measurements of (1) the empty container, (2) the reference material, and (3) the sample to be measured are completed, the control unit 104 records results of these analyses (measured data) in the memory unit 102. Here, according to the present embodiment, the analysis conditions of the standard "ISO 11357-4" read out from the memory unit 102 by the control unit 104 include a method of interpreting the results of analyses. Accordingly, the control unit 104 automatically interprets the results of the analyses based on the read out analysis conditions (step S48).

As described above, since analysis conditions of the standard corresponding to the analytical technique are displayed in time sequence, the display may guide the operator to determine whether the analysis is being performed in accordance with the standard. Also, by prompting to input analysis conditions in time sequence, a system determines whether the input analysis condition complies with the standard and, when the result of the determination is positive, the system prompts to display or input of the next analysis condition, thereby preventing erroneous analysis with analysis conditions not complying with the standard.

Therefore, even when an analysis is performed in accordance with a complicated standard, the workload on an operator can be reduced and erroneous analysis can be prevented.

Also, when an analyzing apparatus is configured to automatically interpret results of analyses in accordance with the standard, the workload on the operator is further reduced.

Next, examples of switching screen displayed on the display unit 106 according to the flows of FIG. 4 and FIG. 5 are illustrated in FIGS. 6 to 17.

Figure 6:
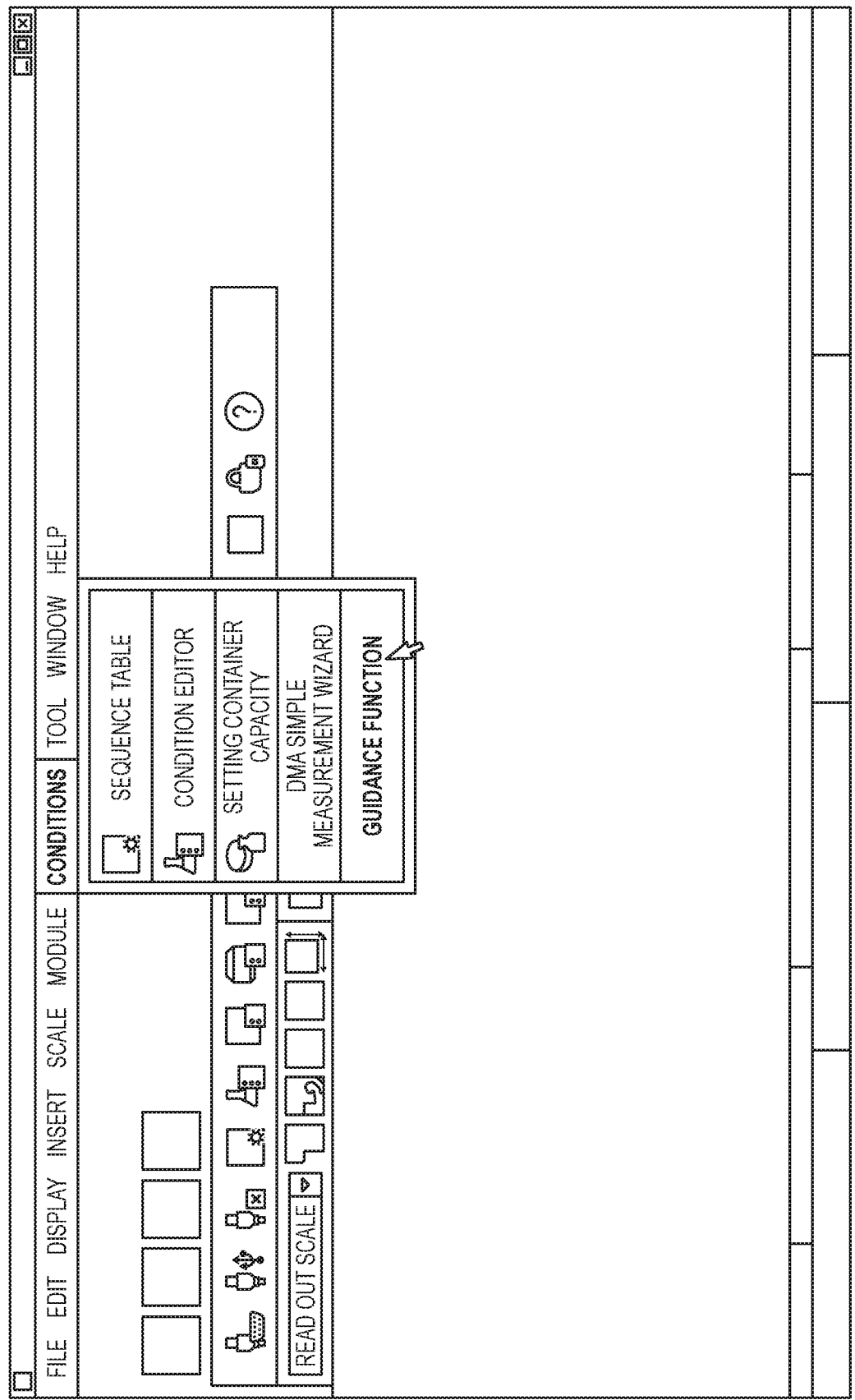
FIG. 6 is a diagram illustrating an example of switching a screen displayed on a display unit.
Figure 7:
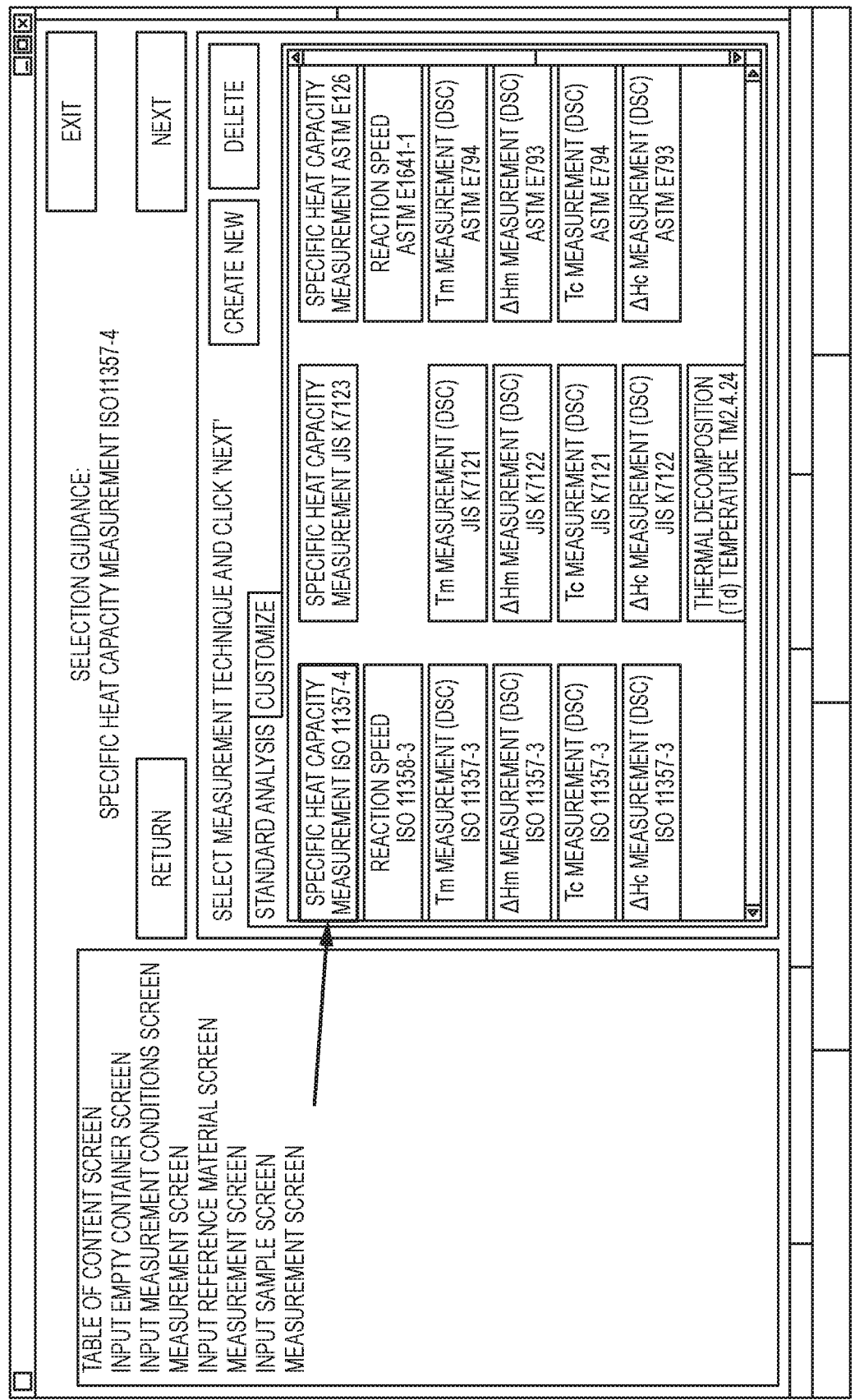
FIG. 7 is a diagram continuing from FIG. 6.

First, when "guidance function" is selected on the screen illustrated in FIG. 6 and the flow of FIG. 4 starts, the "select standard and analytical technique screen" (step S2 in FIG. 4) illustrated in FIG. 7 is displayed. Here, it is assumed that "specific heat capacity measurement ISO 11357-4" is selected in FIG. 7.

When the selection is made in FIG. 7, the screen jumps to the screen of FIG. 8 and guidance information regarding the chronological entire procedure of the "specific heat capacity measurement ISO 11357-4" is displayed. When the operator checks the contents of the screen of FIG. 8 and clicks the "next" button, the screen jumps to the screen of FIG. 9.

The screen of FIG. 9 prompts to input empty container information (step S41 of FIG. 5). When the operator inputs the empty container information and clicks the "next" button, the screen jumps to the screen of FIG. 10.

The screen of FIG. 10 prompts to input a measurement condition (step S42 in FIG. 5). The operator inputs the measurement condition by opening a method file at the center of the screen and changing numerical values of a heating pattern, which is the measurement condition therein, as necessary.

When the operator clicks "next" in the screen of FIG. 10, if the numerical values of the heating pattern comply with analysis conditions, the screen jumps to the screen of FIG. 11 through the above-described step S43. When the operator clicks "start measurement", DSC measurement of an empty container is performed. On the other hand, if the numerical values of the heating pattern do not comply with the analysis conditions, even when the operator clicks "next", only a warning screen indicating that the input values do not comply with the standard is displayed, and the screen does not jump to the screen of FIG. 11.

After the measurement, when the operator clicks "next" on the screen of FIG. 10, the screen jumps to the screen of FIG. 12.

In the screen of FIG. 12, "reference material information" is displayed (step S44 of FIG. 5). In detail, "α-alumina having a purity of 99.9% or higher (synthetic sapphire or the like)", which is the analysis condition of the "reference material", is displayed to guide the operator. Next, when the operator clicks "next", the screen jumps to the screen of FIG. 13.

Figure 13:
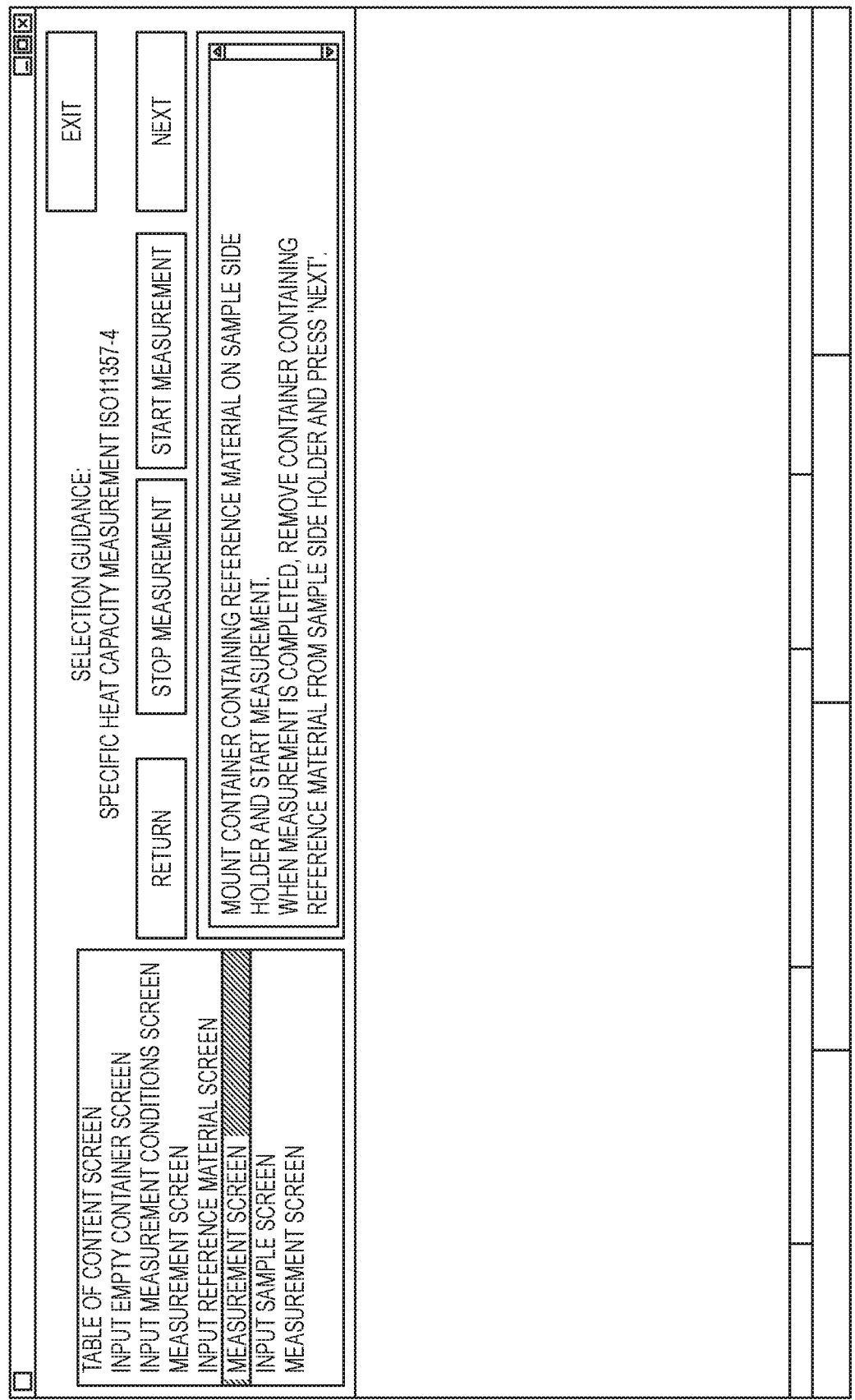
FIG. 13 is a diagram continuing from FIG. 12.

In the screen of FIG. 13, the actual measurement procedure e.g., container installation order) when measuring the reference material by DSC is displayed to guide the operator (step S45 in FIG. 5). Next, when the operator clicks "start measurement", the measurement is started. When the operator clicks "next" after the measurement is completed, the screen jumps to the screen of FIG. 14.

The screen of FIG. 14 prompts to input information regarding sample to be measured (step S46 in FIG. 5). When the operator inputs the mass of sample to be measured, the control unit 104 determines whether the mass of sample to be measured complies with analysis conditions. When the result of the determination is positive, the control unit 104 performs a control to jump to the screen in FIG. 15. On the other hand, when the result of the determination is negative, a warning is displayed in the input box in the screen of FIG. 14 as indicated by an arrow to call the operator's attention to adjust the weight of sample to be measured. Also, even when the operator clicks "next", only a warning screen indicating that the input values do not comply with the standard is displayed, and the screen does not jump to the screen of FIG. 15.

Figure 15:
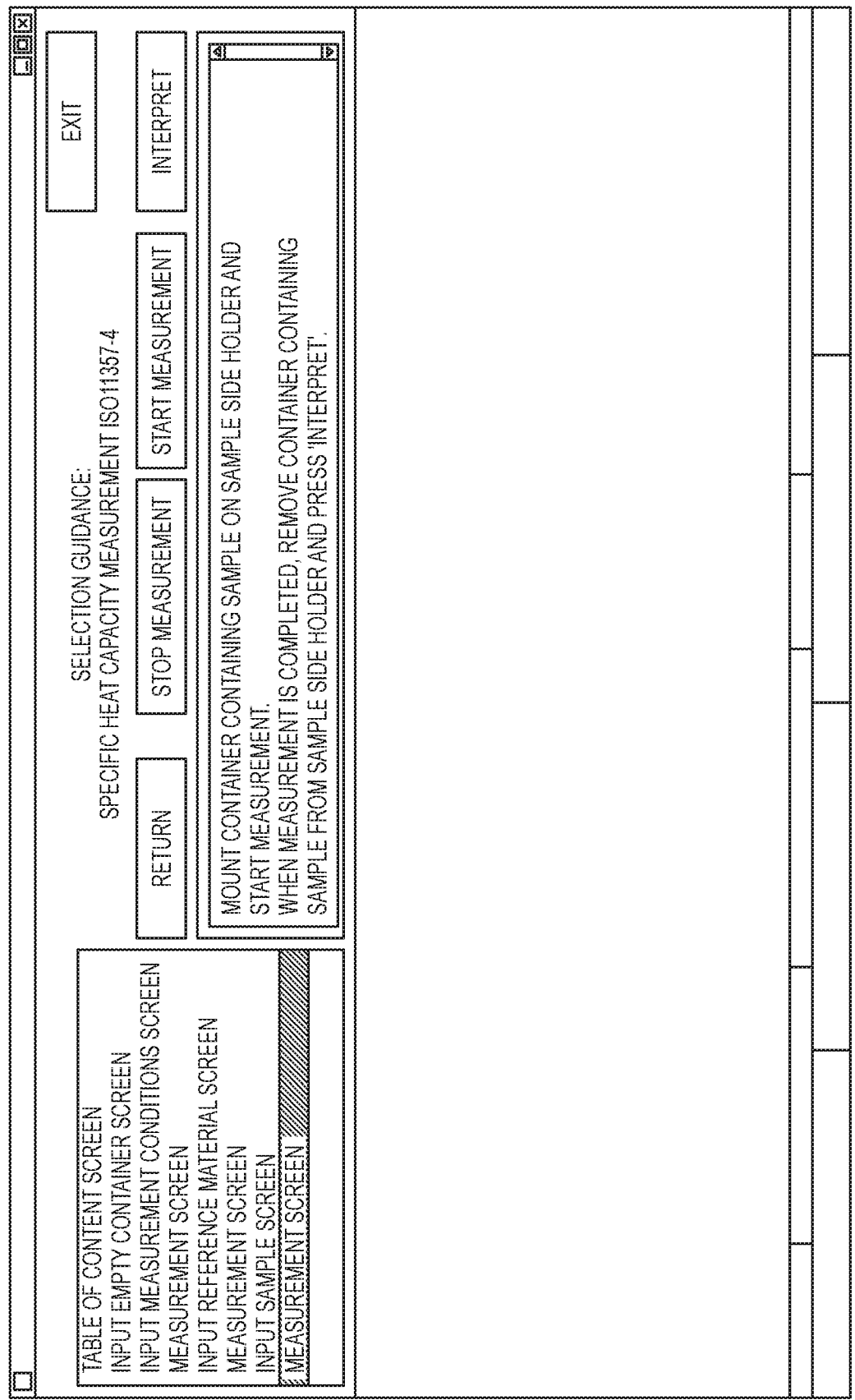
FIG. 15 is a diagram continuing from FIG. 14.
Figure 16:
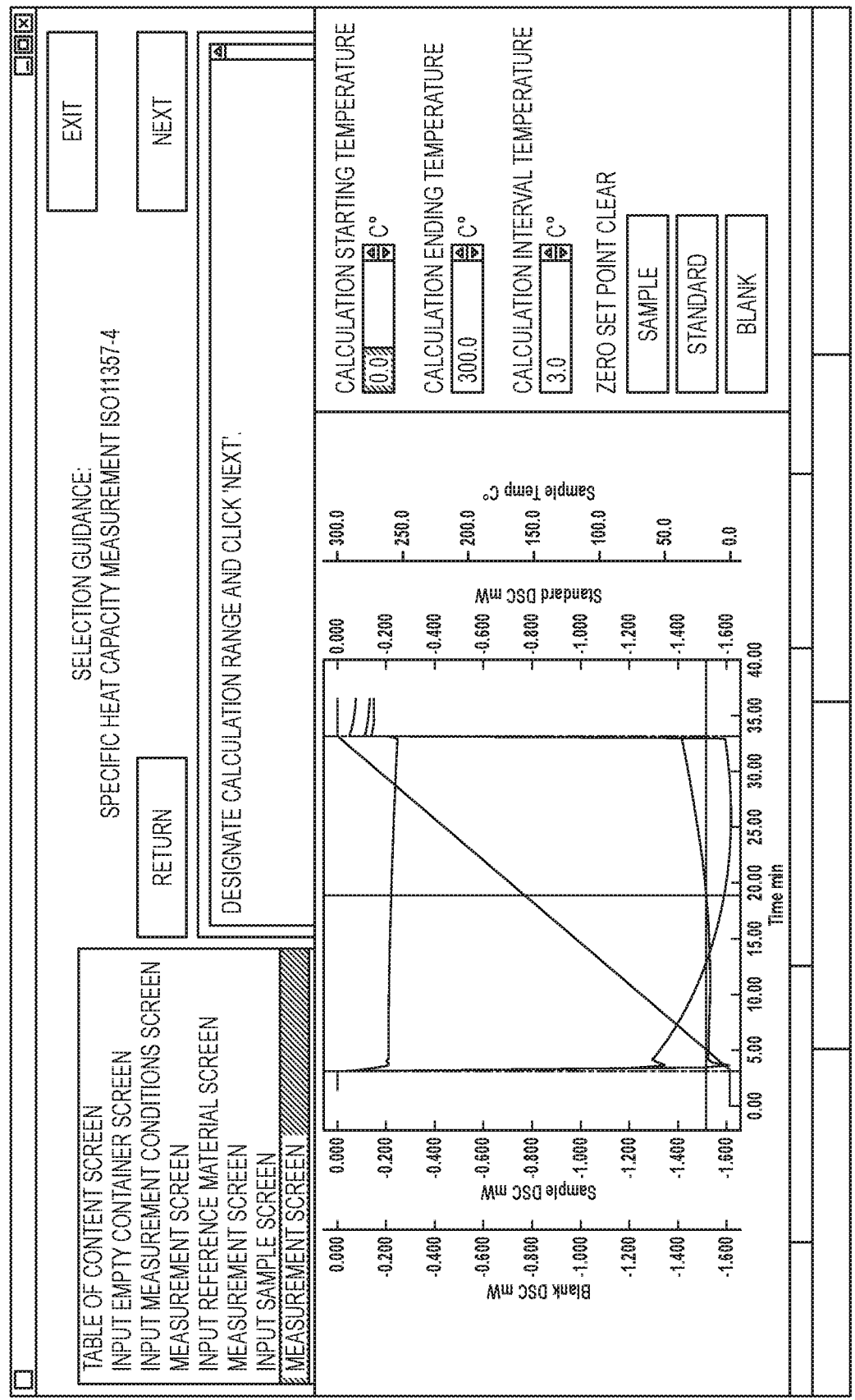
FIG. 16 is a diagram continuing from FIG. 15.
Figure 17:
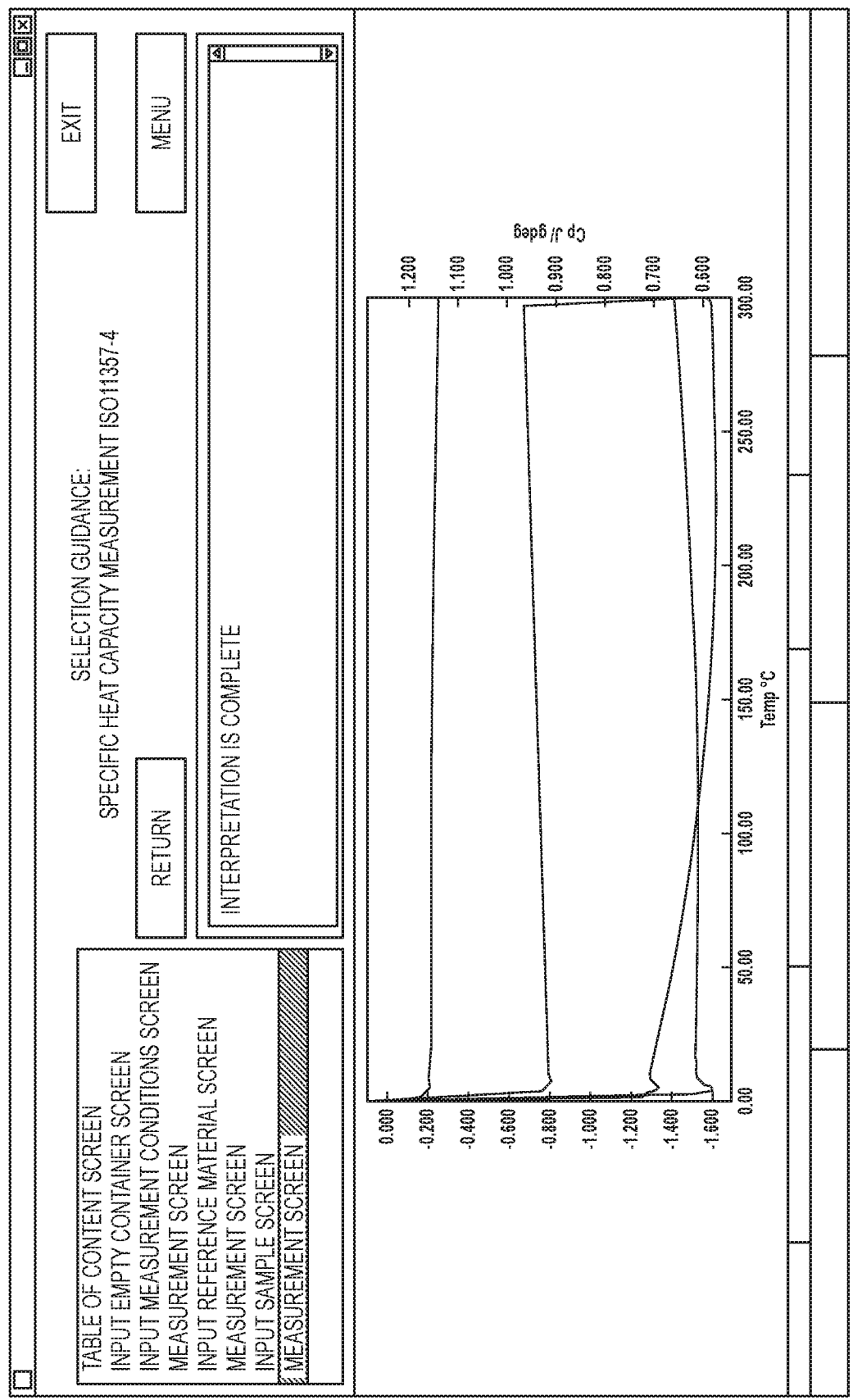
FIG. 17 is a diagram continuing from FIG. 16.

In the screen of FIG. 15, the actual measurement procedure (e.g., container installation order) when measuring the reference material by DSC is displayed to guide the operator (step S47 in FIG. 5). Next, when the operator clicks "start measurement", the DSC measurement starts. When the operator clicks "interpret" after the DSC measurement is completed, the screen jumps to the screen of FIGS. 16 and 17 and the result of interpretation in accordance with the standard is automatically displayed (step S48 of FIG. 5).

Here, in the analyzing method according to the present disclosure, the processes executed by the control unit correspond to a first process, a second process, a third process, and a fourth process, respectively.

The present disclosure is not limited to the above-described embodiments, but it goes without saying that it extends to various modifications and equivalents included in the spirit and scope of the present invention.

What is claimed is:

1. An analyzing apparatus comprising:
a memory unit configured to store analysis conditions of one or more standards specifying analysis conditions for each of one or more analytical techniques;
a control unit;
a display unit;
an input unit; and
an analysis unit configured to perform an analysis in accordance with the analytical technique,
wherein when the analytical technique is designated, the control unit reads out the analysis conditions of the corresponding standard, and the control unit displays analysis conditions in time sequence, the displayed analysis conditions being necessary for the analysis by the analysis unit and selected from out of the read-out analysis conditions, or the control unit prompts to input the analysis conditions in time sequence, and
when the analysis conditions are input through the input unit, the control unit determines whether or not the input analysis conditions comply with the read-out analysis conditions, and in a case where a result of the determination is positive, the control unit displays a next analysis condition being necessary for the analysis by the analysis unit, or the control unit prompts to input the next analysis condition.

2. The analyzing apparatus of claim 1,
wherein the analysis conditions include temperature control information of a sample to be analyzed, sample atmosphere information, mass of the sample, composition of a reference sample, and mass of a sample container.

3. The analyzing apparatus of claim 1,
wherein the analysis conditions include an interpretation method for each of the analytical techniques, and
the control unit automatically performs an interpretation of a result of the analysis by the analysis unit based on the read-out analysis conditions, the interpretation corresponding to the analytical technique.

4. An analyzing method of storing analysis conditions of one or more standards specifying analysis conditions for each of one or more analytical techniques to perform an analysis corresponding to the analytical technique, the method comprising:
a first step of, when the analytical technique is designated, reading out the analysis conditions of the corresponding standard, and displaying analysis conditions in time sequence, the displayed analysis conditions being necessary for the analysis and selected from out of the read-out analysis conditions, or prompting to input the analysis conditions in time sequence, and
a second step of, when the analysis conditions are input through an input unit, determining whether or not the input analysis conditions comply with the read-out analysis conditions, and in a case where a result of the determination is positive, displaying a next analysis condition being necessary for the analysis, or prompting to input the next analysis condition.

5. The analyzing method of claim 4,
wherein the analysis conditions include temperature control information of a sample to be analyzed, sample atmosphere information, mass of the sample, composition of a reference sample, and mass of a sample container.

6. The analyzing method of claim 4,
wherein the analysis conditions include an interpretation method for each of the analytical techniques, and
the method further comprises a step of automatically performing an interpretation of a result of the analysis based on the read-out analysis conditions, the interpretation corresponding to the analytical technique.

7. The analyzing method of claim 4, further comprising:
a step of reporting a warning in a case where the result of the determination in the second step is negative.

8. The analyzing method of claim 7,
wherein the warning includes a report of the analysis conditions in order that the result of the determination in the second step becomes positive.

* * * * *